US008737803B2

(12) United States Patent
Pereira

(10) Patent No.: US 8,737,803 B2
(45) Date of Patent: May 27, 2014

(54) METHOD AND APPARATUS FOR STORING AND STREAMING AUDIOVISUAL CONTENT

(75) Inventor: Romulus Pereira, Sunnyvale, CA (US)

(73) Assignee: Looxcie, Inc., Sunnyvale, CA (US)

( * ) Notice: Subject to any disclaimer, the term of this patent is extended or adjusted under 35 U.S.C. 154(b) by 158 days.

(21) Appl. No.: 13/118,136

(22) Filed: May 27, 2011

(65) Prior Publication Data

US 2012/0301100 A1  Nov. 29, 2012

(51) Int. Cl.
*H04N 5/77* (2006.01)
(52) U.S. Cl.
USPC .......................................... 386/224; 386/210
(58) Field of Classification Search
None
See application file for complete search history.

(56) References Cited

U.S. PATENT DOCUMENTS

| | | | |
|---|---|---|---|
| 3,542,457 A | 11/1970 | Balding et al. |
| 4,051,534 A | 9/1977 | Dukich et al. |
| 4,398,799 A | 8/1983 | Swift |
| 4,425,586 A | 1/1984 | Miller |
| 4,516,157 A | 5/1985 | Campbell |
| 4,797,736 A | 1/1989 | Kloots et al. |
| 5,091,719 A | 2/1992 | Beamon |
| 5,189,512 A | 2/1993 | Cameron et al. |
| 5,886,739 A | 3/1999 | Winningstad |
| 6,233,389 B1 | 5/2001 | Barton et al. |
| 6,307,526 B1 | 10/2001 | Mann |
| 6,563,532 B1 | 5/2003 | Strub et al. |
| 7,271,827 B2 | 9/2007 | Nister |
| 7,331,666 B2 | 2/2008 | Swab et al. |
| 7,450,841 B2 | 11/2008 | Jung |
| 7,483,485 B2 | 1/2009 | Winningstad et al. |
| 7,522,212 B2 | 4/2009 | Wang et al. |
| D616,873 S | 6/2010 | Olivier |
| 7,798,728 B2 | 9/2010 | Lee |
| D633,935 S | 3/2011 | Kaplan et al. |
| 2001/0012051 A1 | 8/2001 | Hara et al. |

(Continued)

FOREIGN PATENT DOCUMENTS

| | | |
|---|---|---|
| JP | 2003204282 | 7/2003 |
| JP | 2006074671 | 3/2006 |

(Continued)

OTHER PUBLICATIONS

Office Action for U.S. Appl. No. 12/882,189 dated Jan. 29, 2013, 8 pages.

(Continued)

*Primary Examiner* — William C Vaughn, Jr.
*Assistant Examiner* — Eileen Adams
(74) *Attorney, Agent, or Firm* — Blakely, Sokoloff, Taylor & Zafman, LLP

(57) ABSTRACT

A camcorder includes an input interface via which audiovisual information is received at a first rate measured in frames per second, n. A media processor coupled via a bus to the input interface receives the audiovisual information at the rate n, and transfers it to a capture buffer coupled via the bus at a second rate measured in frames per second, x, for storage. An output interface coupled via the bus to the media processor transmits the audiovisual information at a third rate measured in frames per second, y, wherein x plus y is less than or equal to n. A set of computing instructions executed on the general purpose processor in the camcorder program the media processor to transfer the audiovisual information to the capture buffer at the rate x and to transmit the audiovisual information at the rate y to the output interface.

6 Claims, 4 Drawing Sheets

(56) References Cited

U.S. PATENT DOCUMENTS

| | | | |
|---|---|---|---|
| 2003/0200326 | A1 | 10/2003 | Leighton et al. |
| 2004/0130501 | A1 | 7/2004 | Kondo et al. |
| 2005/0015509 | A1 | 1/2005 | Sitaraman |
| 2005/0100311 | A1 | 5/2005 | Hohenacker |
| 2005/0102427 | A1 | 5/2005 | Yokota et al. |
| 2005/0198344 | A1 | 9/2005 | Fujita |
| 2005/0202857 | A1 | 9/2005 | Seshadri et al. |
| 2005/0278759 | A1 | 12/2005 | Unger |
| 2005/0283818 | A1 | 12/2005 | Zimmermann et al. |
| 2006/0139475 | A1 | 6/2006 | Esch et al. |
| 2006/0230170 | A1 | 10/2006 | Chintala et al. |
| 2006/0248212 | A1 | 11/2006 | Sherer et al. |
| 2007/0107028 | A1 | 5/2007 | Monroe et al. |
| 2007/0115764 | A1* | 5/2007 | Ueki ................. 369/30.23 |
| 2008/0063362 | A1 | 3/2008 | Grigorian |
| 2008/0072261 | A1 | 3/2008 | Ralston et al. |
| 2008/0080556 | A1 | 4/2008 | Shimada |
| 2008/0136819 | A1* | 6/2008 | Shivas et al. ................. 345/428 |
| 2008/0154610 | A1 | 6/2008 | Mahlbacher |
| 2008/0231684 | A1 | 9/2008 | Underwood et al. |
| 2008/0250101 | A1 | 10/2008 | Tanaka et al. |
| 2008/0266448 | A1 | 10/2008 | Reiner et al. |
| 2008/0288986 | A1 | 11/2008 | Foster et al. |
| 2008/0311997 | A1 | 12/2008 | Goossen et al. |
| 2009/0189981 | A1 | 7/2009 | Siann et al. |
| 2009/0247245 | A1 | 10/2009 | Strawn et al. |
| 2009/0249405 | A1 | 10/2009 | Karaoguz et al. |
| 2009/0262205 | A1 | 10/2009 | Smith |
| 2009/0300698 | A1 | 12/2009 | Quigley et al. |
| 2010/0094969 | A1 | 4/2010 | Zuckerman et al. |
| 2010/0109878 | A1 | 5/2010 | Desrosiers |
| 2010/0118158 | A1 | 5/2010 | Boland et al. |
| 2010/0195974 | A1 | 8/2010 | Zheng et al. |
| 2010/0245585 | A1 | 9/2010 | Fisher et al. |
| 2010/0306801 | A1 | 12/2010 | Filippov et al. |
| 2010/0328471 | A1 | 12/2010 | Boland et al. |
| 2011/0096168 | A1* | 4/2011 | Siann et al. ................. 348/158 |
| 2011/0116376 | A1 | 5/2011 | Pacella et al. |
| 2012/0148214 | A1* | 6/2012 | Black ................. 386/241 |
| 2012/0262576 | A1 | 10/2012 | Sechrist et al. |
| 2012/0293522 | A1* | 11/2012 | Ahmad et al. ................. 345/502 |

FOREIGN PATENT DOCUMENTS

| | | |
|---|---|---|
| KR | 1020040024682 | 3/2004 |
| WO | WO-2006064170 | 6/2006 |
| WO | WO-2007116334 | 10/2007 |
| WO | WO-2008124786 | 10/2008 |

OTHER PUBLICATIONS

Non-Final Office Action for U.S. Appl. No. 12/612,980 dated Dec. 8, 2011, 17 pages.

Non-Final Office Action for U.S. Appl. No. 12/612,972 dated Dec. 5, 2011, 16 pages.

Non-Final Office Action for U.S. Appl. No. 12/612,972 dated Apr. 23, 2012, 15 pages.

Non-Final Office Action for U.S. Appl. No. 12/612,972 dated Dec. 6, 2012, 16 pages.

Non-Final Office Action for U.S. Appl. No. 13/118,153 dated Jan. 4, 2013, 26 pages.

Non-Final Office Action for U.S. Appl. No. 13/118,146 dated Jan. 7, 2013, 16 pages.

International Preliminary Report on Patentability for Application No. PCT/US2009/063617 dated May 10, 2011, 4 pages.

International Search Report and Written Opinion for International Application No. PCT/US2012/039014 dated Dec. 18, 2012, 9 pages.

European Search Report for European Application No. 09825511.0 dated May 15, 2012, 5 pages.

www.Justodians.org/Stopping Evil.htm (no posting date found on website, http://www.archive.org/web/web.php generates a date of May 2, 2008), 5 pages.

Non-Final Office Action for U.S. Appl. No. 29/340,177 dated Mar. 15, 2011, 6 pages.

Notice of Allowance for U.S. Appl. No. 12/612,980 dated Apr. 5, 2012, 8 pages.

"GoPro. Be a HERO." http://gopro.com/, Homepage, 2012, Woodman Labs, Inc., last visited Dec. 6, 2012, 1 page.

International Search Report and Written Opinion for International Application No. PCT/US2009/063617 dated Jun. 23, 2010, 6 pages.

CONTOUR, "Introducing CONTOURROAM2", http://contour.com/, Homepage, 2012, last visited Dec. 6, 2012, 1 page.

Tessera, "OptiMP Wafer-Level Camera Technology Flyer", www/tessera.com/technologies/imagingandoptics/waferleveloptics.aspx, retrieved on Jun. 22, 2009, (Feb. 2009), 5 pages.

"Notice of Allowance for U.S. Appl. No. 12/882,189", (May 7, 2013), Whole Document.

"Notice of Allowance for U.S. Appl. No. 12/612,972", (Jun. 6, 2013), Whole Document.

Notice of Allowance for U.S. Appl. No. 12/612,972 dated Jun. 6, 2013, Whole Document.

"Office Action for U.S. Appl. No. 13/118,160", (Aug. 13, 2013), Whole Document.

"Final Office Action for U.S. Appl. No. 13/118,146", (Sep. 16, 2013), Whole Document.

"International Preliminary Report on Patentability (Chapter I of the Patent Cooperation Treaty) for International Application No. PCT/US2012/039014", (Dec. 12, 2013), Whole Document.

"Notice of Allowance for U.S. Appl. No. 12/612,972", (Oct. 3, 2013), Whole Document.

* cited by examiner

METHOD AND APPARATUS FOR STORING AND STREAMING AUDIOVISUAL CONTENT

FIELD

The invention relates to audiovisual streaming. In particular, the invention relates to real-time audiovisual streaming from a wireless camcorder to a plurality of invited handheld devices over an internetwork.

BACKGROUND

Headset camcorders are well known in the art. For example, the Looxcie LX1 camcorder is available from the assignee of the present invention. The Looxcie headset camcorder records and wirelessly transmits video to a mobile cellular communication device, allowing a wearer to view the video on the device's display screen. In particular, the camcorder captures video at 480p resolution at 30 frames per second and wirelessly transmits, via the Bluetooth™ open wireless technology standard, a Moving Picture Experts Group 4 (MPEG4) encoded recording to an Apple iPhone or Android operating system-based smartphones. The smartphone can act as a viewfinder for properly aligning the camcorder with the wearer's field of vision and allows the wearer to share videos via e-mail or post them on Facebook or YouTube.

Real-time audiovisual streaming is also well known in the art. For example, the Apple iPhone FaceTime feature provides for audiovisual communication between two iPhone users. Additionally, qik is a mobile real-time video streaming and two-way video conferencing application that allows users to stream live video from their mobile phones to the Internet.

What is needed, however, is a real-time audiovisual streaming method and apparatus that provides for improved streaming of audiovisual content from a headset camcorder to a selected group of mobile communications or computing device over an internetwork.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Overview

Figure 1:
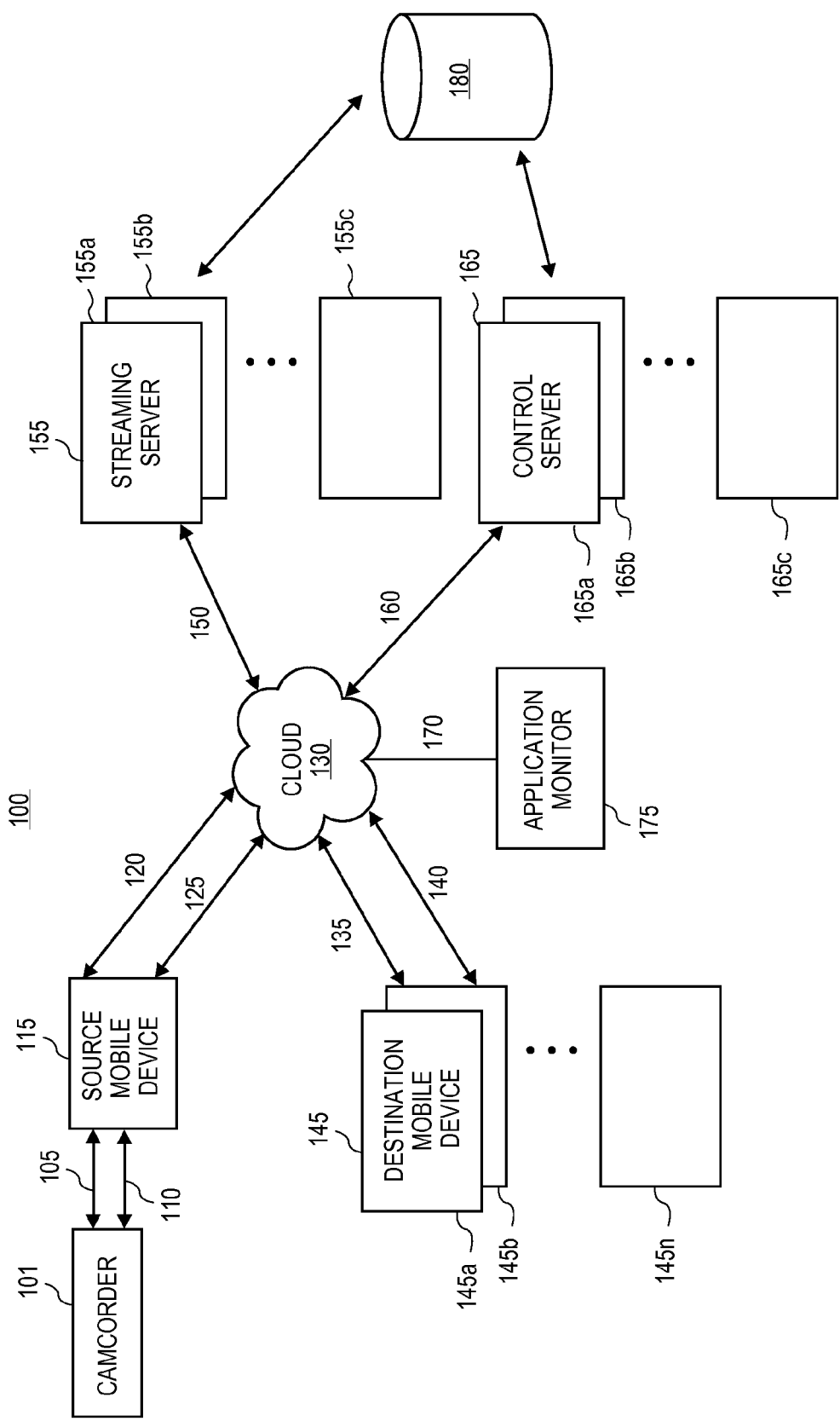
FIG. 1 is a diagram of a real-time audiovisual streaming architecture in accordance with an embodiment of the invention.

An embodiment of the invention permits individuals to stream live audio and video, that is, transmit a "real-time audiovisual stream", from a headset camcorder, such as the Looxcie LX1, available from the assignee of the invention, to invited viewers, using a smartphone as a gateway in wireless communication with the camcorder. The audiovisual stream is wirelessly transported to a source mobile device, for example, the stream may be transmitted via Bluetooth to a smartphone, a tablet computer, a personal digital assistant (PDA), a laptop computer, etc., then to a streaming server, from where it may be distributed to viewers who are authorized to view that stream ("invited viewers"). The phrase real-time audiovisual stream as used herein refers to live streaming which involves taking multimedia content and broadcasting it over a telecommunications network and/or the Internet, where the content can essentially be viewed by end-users live. Practically speaking, there is of course some delay between the broadcasting of the stream and the live viewing of the stream by end-users owing to delays that occur in the network as the stream passes through and is buffered in various nodes and traverses multiple network segments.

According to one embodiment of the invention, the real-time audiovisual stream uses a "personal cast" session model, implying that sessions are created between a broadcaster operating the headset camcorder and accompanying source mobile device with known contacts and distributed to known viewers. According to another embodiment of the invention, the broadcaster may stream to a channel that can be viewed by many. For example, an Internet service provider may define broadcast channels to carry live audiovisual content.

Given the headset camcorder is contemplated transporting a fixed video format to a broadcaster's mobile device, an embodiment of the invention monitors and adopts a streaming bitrate to accommodate sessions connected to a streaming server via different communication technologies such as 3G cellular communications, 4G cellular communications, and Wi-Fi (IEEE 802.11). It is contemplated therefore that an embodiment of the invention adjusts the end-to-end throughput of the audiovisual content in a range of 100 kbps to 500 kbps or higher based on the network conditions. In one embodiment of the invention, the audiovisual stream is transcoded to H.264 format for viewing.

According to an embodiment of the invention, a personal cast session between a broadcaster and a community of users is created via invitation, in other words, viewers are only able to view available sessions that they are invited to view. The personal cast session model involves disclosing the presence and state of broadcasters to particular viewers, and the ability of those viewers to intentionally select sessions to view or broadcast. In one embodiment, a personal cast session defines a relationship between one broadcaster and a limited number of individually invited viewers. In an alternative embodiment, a personal cast session is established between a broadcaster (e.g., video blogger) and an invited group of viewers or broadcast viewing channels.

FIG. 1 provides an illustration of a real-time audiovisual streaming architecture 100 in accordance with an embodiment of the invention. A description of an overview of the architecture and operation of the same follows, with reference to FIG. 1. A camcorder 101 may be worn by an individual, or may be placed proximate the individual. For example, the camcorder may be worn on either ear of the individual by means of a flexible rubberized ear loop, or the camcorder may be mounted on an apparatus controlled by the individual, such as a bicycle. A rotating camcorder barrel may be adjusted to keep the camcorder level. The camcorder is the source of an audiovisual stream that may ultimately be transmitted to one or more invited viewers at destination cellular mobile communication devices 145a-145n ("invited viewers 145"). The individual wearing the camcorder 101 ("the broadcaster") can control camcorder 101 via an interface to cause the camcorder to record audiovisual content and to transmit at least a portion of the audiovisual content to a source cellular mobile communication device 115 for forwarding to the invited viewers 145. It should be noted that each of destination cellular mobile communication devices 145a-145n can equally be configured and operate as a source cellular mobile communication device and be coupled to a respective camcorder to receive wirelessly from the camcorder an audiovisual stream for transmission to one or more invited viewers as described below. Likewise, source mobile device 115 can equally be configured to operate according to a destination mobile device 145.

Camcorder 101 is wirelessly coupled to source cellular mobile communication device 115. For example, camcorder 101 may communicate with source mobile device 115 via the Bluetooth™ wireless communication protocol, according to one embodiment of the invention. Alternatively, camcorder 101 may communicate with source mobile device 115 via other wireless Personal Area Network (PAN) or Local Area Network (LAN) communication technologies such as IrDA (infrared Data Association), wireless Universal Serial Bus (USB), and Wi-Fi based on the IEEE 802.11 standards.

Source cellular mobile communications device 115 may be a smartphone, such as an Apple iPhone or a Google Android operating system-based smartphone with a video display screen via which the individual wearing camcorder 101 and holding source mobile device 115 can view the source audiovisual content transmitted from the camcorder to the source mobile device. (A smartphone is a mobile phone that has advanced computing capability and connectivity relative to a low-end mobile phone, and indeed can be thought of as a handheld computer integrated with a mobile telephone.) Alternatively, source mobile device 115 may be a tablet computer, a personal digital assistant (PDA), a laptop computer, and may utilize either a cellular mobile communications transmitter and/or another wireless communications technology-based transmitter, for example, a Wi-Fi transmitter.

Source cellular mobile communications device 115 is coupled to an internetwork such as the Internet, or cloud, 130. Various aspects of the physical communication infrastructure necessary for source mobile device 115 to be coupled to the cloud 130 are not shown in FIG. 1 in order to not obscure the invention since it is well known to those skilled in the art that source mobile device 115 may communicate via a 3G or 4G radio-based communication link to a cellular mobile communications base station and a gateway mobile switching center (MSC), which in turn is coupled to a public switched telephone network (PSTN) to allow source mobile device 115 to communicate with other phones and devices over the PSTN and the Internet. Alternatively, source mobile device 115 may communicate with the Internet via Wi-Fi.

An audiovisual content streaming server 155, or simply streaming server 155 is coupled to cloud 130 to receive the audiovisual stream from source mobile device 115 and forward the stream to invited viewers 145a-145n. As such, the streaming server's primary function is fast packet switching, wherein a source mobile device 115 uploads an audiovisual stream of packets to the streaming server. The streaming server forwards the packets to a broadcast port to which destination mobile cellular communication devices (invited viewers) 145a-145n connect to receive the audiovisual stream of packets. While a single streaming server 155 may be able to receive many audiovisual streams concurrently from multiple source mobile devices 115, a number of streaming servers 155a-155n coupled to the cloud is contemplated in accordance with one embodiment of the invention in order to provide for large numbers of camcorders and corresponding source cellular mobile communication devices simultaneously streaming respective audiovisual content, and further to provide for large numbers of invited viewers to connect to a broadcast port to receive streams of audiovisual content. An application monitor 170 monitors performance of each of the streaming servers and selects one of the streaming servers to receive the audiovisual stream from source mobile device 115.

It should be noted that while the embodiment of the invention illustrated in FIG. 1 depicts a single camcorder 101 and counterpart source mobile device 115, it is anticipated that hundreds, or thousands, or even greater numbers, of such camcorders and source mobile devices could be active and streaming audiovisual content at the same time. Thus, application monitor 170 is capable of selecting additional ones of streaming servers 155a-155n as needed in order to provide adequate bandwidth to handle multiple concurrent real-time audiovisual streams from multiple camcorders and accompanying source mobile devices 115.

A control server 165 is coupled to cloud 130 to control a connection between source mobile device 115 and the streaming server 155 selected by application monitor 170. It is contemplated that a number of control servers 165a-165n be coupled to the cloud in accordance with one embodiment of the invention in order to provide for managing a large number of concurrent connections between different source cellular mobile communication devices and streaming servers, each connection carrying audiovisual content, as well as for managing a large number of concurrent connections between streaming servers and invited viewers.

Application monitor 170 monitors performance of each of the control servers and selects one of the control servers, based on its monitoring of the control servers, to establish control with source mobile device 115 for the purpose of enabling transmission of the audiovisual stream to the selected streaming server 155. The control server 165 further establishes control with at least one of the invited viewers 145 to enable a broadcast of the audiovisual stream from the selected streaming server 155 to the invited viewer 145.

A database management system and nonvolatile storage component 180 is coupled to the streaming servers 155a-155n to provide information relating to subscription services and authentication of source mobile devices 115 and corresponding camcorders 101, and invited viewers 145a-145n, and further information relating to data usage and billing services for account holders for both camcorder broadcasters (wherein typically there is a unique account for each audiovisual stream source) and invited viewers. The database management system further stores and provides to control servers 165a-165n information relating to account holder profiles and contacts or friends associated with a particular account.

Application Monitoring

The application monitoring platform 175, or simply, application monitor 175, communicates with streaming servers 155a-155n via its link 170 to cloud 130. In particular, application monitor 175 monitors the performance of each of the streaming servers 155a-155n coupled to the cloud 130 via link 150. The application monitor selects a streaming server 155 to receive the audiovisual stream over cloud 130 from source mobile device 115 and broadcast the received audiovisual stream back over the cloud 130 to invited viewers 145. The application monitor selects a particular streaming server based on monitoring performance of each of the streaming servers. Likewise, application monitor 175 monitors performance of each the control servers 165a-165n coupled to the cloud 130 via link 160. The application monitor selects a control server to establish control with the source mobile device 115 when it is ready to transmit a stream of audiovisual content from an accompanying camcorder 101. The selected control server 165 enables transmission of the audiovisual stream from the source mobile device 115 to the selected streaming server 155 via cloud 130. The application monitor further establishes control with an invited viewer 145 to enable the broadcast of the audiovisual stream received by the selected streaming server 155 to the invited viewer 145 over cloud 130.

According to one embodiment of the invention, the application monitor 175 monitors the performance of each of the streaming servers and each of the control servers by monitoring the processor load for each server. Additionally or alternatively, application monitor 175 monitors the performance of servers by monitoring traffic bandwidth usage for each server. According to one embodiment of the invention, by separating the streaming servers from the control servers, and managing bringing online or taking offline individual streaming servers or control servers, the embodiment is able to independently scale, whether up or down, the number of streaming servers versus the number control servers needed for the internetwork architecture to support a variable number of real-time audiovisual streaming sessions between different audiovisual stream sources and respective invited viewers.

End-to-End Throttling of Audiovisual Content Stream

Throttling in the context of an embodiment of this invention generally can be thought of as a limitation of frames of an audiovisual data stream to be transferred from one node to a subsequent node of a communications network based on the ability of the next node to accommodate the audiovisual stream's data rate. Audiovisual content is encoded from raw audio frames and raw video frames. This content is transmitted across the communications network from the headset camcorder 101 to the destination cellular mobile communication device 145 by travelling from the camera in the camcorder through a series of nodes, namely, the radio transceiver in the camcorder 101, the source cellular mobile communication device 115, the streaming server 155, and finally the destination mobile device 145.

The media processor in camcorder 101 encodes and compresses a raw video stream (in one embodiment, the stream is 30 frames per second and a VGA resolution of 640×480 pixels) into MPEG-4 compressed video frames). As described below, when the output buffer at each node "overflows", the node drops some frames it transmits. While this does reduce the number of frames displayed on the destination mobile device, it keeps quality of the video frames that are displayed as high as possible.

In general, controlling the rate of transmission of the audiovisual stream from each node is handled in the same manner, whether that node is the radio transceiver in the camcorder 101, the source mobile device 115, or the streaming server 155, as described below. Additionally, the combination of throttling by each of these nodes provides for end-to-end throttling from the camcorder 101 to the destination mobile device 145. At each node, there is an output buffer associated with a transmit queue. Frames of the audiovisual stream are queued for transmission in the output buffer allocated to a transmit queue. The frames are transmitted from the transmit queue over a communications channel to the next node in the sequence of nodes from the camcorder to the destination mobile device until the frames arrive at the destination mobile device. The destination mobile device processes the frames it receives to display the audiovisual content carried therein on its display screen.

If the transmit queue in any one node is experiencing congestion, that is, if the transmit queue is filling up, passes some threshold, or is full, for example because the node is receiving packets faster than it can transmit them, then the node may throttle the rate at which it transmits frames of the audiovisual stream. For example, the node may drop some frames in an effort to prevent an output buffer overflow (and to keep audiovisual content transmission near real-time). In one embodiment, the frames can be dropped in such a way as to maximize the user's viewing and listening experience at the destination cellular mobile communication device 145. This throttling process can be implemented without a control channel if every node knows which frames to drop. A node may also, or alternatively, according to one embodiment of the invention, send a control message via a control channel coupled between the node and a previous node in the communications network if its ability to transmit data is limited or if the node detects that its internal resources are insufficient to process the encoded frames it receives at a minimum rate necessary to maintain acceptable quality of the audiovisual stream. Some examples of this are, if a node's transmit queue is experiencing congestion, if its resources are overloaded, if too many users are currently transmitting, if its internal buffers are being heavily consumed, and/or if it is unable to get adequate processor cycles. The previous node can throttle the rate at which it transmits frames of the audiovisual stream responsive to receiving the control message.

Additionally, or alternatively, according to embodiments of the invention, a node can communicate with a subsequent node in the communications network, for example, by querying the subsequent node to determine whether the subsequent node is experiencing congestion, either in the form of inbound or outbound congestion. This query can be transmitted over the control channel coupled between the two nodes, in one embodiment. If the node receives an indication from the subsequent node, responsive to the query, that the subsequent node is experiencing congestion, the node can throttle the rate at which it transmits frames of the audiovisual stream to the subsequent node responsive to receiving the indication. The indication can also be transmitted over the control channel between the two nodes. A node may also, or alternatively, according to one embodiment of the invention, send a control message via a control channel coupled between the node and a previous node in the communications network responsive to receiving the indication that the subsequent node is experiencing congestion. The previous node can throttle the rate at which it transmits frames of the audiovisual stream to the node responsive to receiving the control message.

Thus, in the above described manner, each node can communicate back in turn to headset camcorder 101 via the control channels 140, 125 and 110, for example, when the node is dropping frames of the audiovisual content stream. If frames are being dropped, in one embodiment, the headset camcorder reduces the multimedia encoding bandwidth to produce smaller frames and/or produce fewer frames. Conversely, the nodes in one embodiment are able to transmit control messages informing the headset camcorder when the network can accommodate more data, the advantage being that the camcorder is able to modify its encoding parameters in such a way as to maximize quality of the video recording and maximize quality of the transmitted audiovisual stream.

Figure 3:
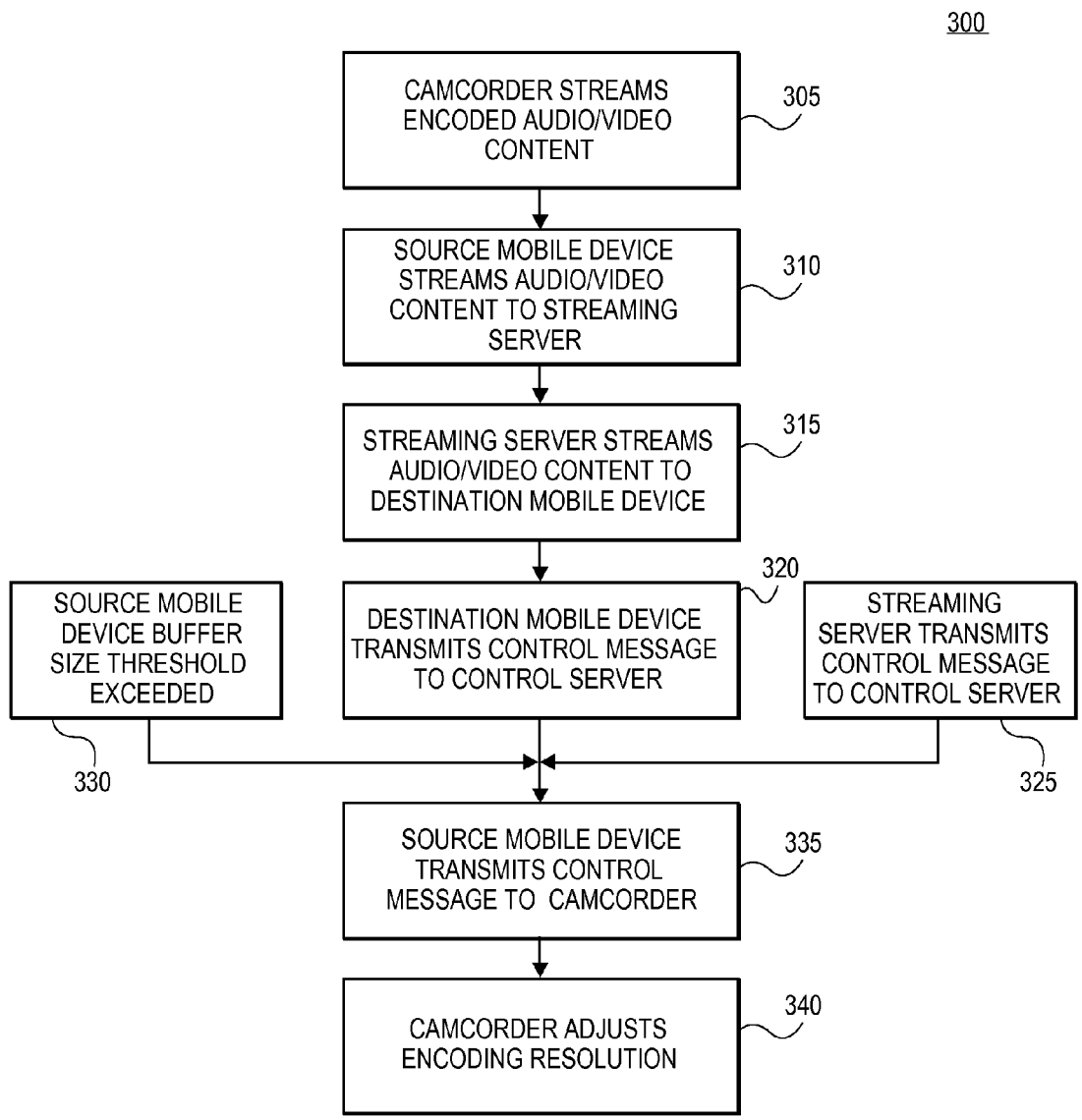
FIG. 3 is a flow chart depicting an embodiment of the invention.

With reference to the flowchart in FIG. 3, in one embodiment of the invention, the headset camcorder 101 records and encodes audiovisual content for transmission via a radio transmitter to the source cellular mobile communication device 115 over communications channel 105. The camcorder encodes the audiovisual content for transmission over a wireless communication channel according to an encoding bit rate selected in accordance with a data rate negotiated and agreed on between the camcorder 101 and the source mobile device 115 when a connection is established over the wireless communication channel 105 between the camcorder and source mobile device. At 305, camcorder 101 streams the encoded audiovisual content.

Likewise, the source mobile device 115 establishes a connection to streaming server 155 over communication channel 120, cloud 130, and communication channel 150. The source mobile device 115 takes the encoded audiovisual content received from camcorder 101 over wireless communication channel 105 and in turn at 310 transmits it over the connection between the source mobile device 115 and streaming server 155, at a data rate negotiated and agreed on between the source mobile device 115 and streaming server 155.

A connection is established between an output port of the streaming server and a destination cellular mobile communication device 145 over communication channel 150, cloud 130, and communication channel 135. The streaming server 155 takes the encoded audiovisual content received from source mobile device 115 and in turn at 315 transmits it over the connection between streaming server 155 and destination mobile device 145 at a data rate negotiated and agreed on between streaming server 155 and destination mobile device 145.

The headset camcorder 101, the source mobile device 115 and the streaming server 155 are each a sending device, or a sender, in the sense that each sending device transports the audiovisual content to a respective receiving device. To transmit the audiovisual stream, as described above, each sender maintains an output buffer to hold audiovisual frames to be transmitted. In particular, at the streaming server, each output port of the streaming server maintains an output buffer to hold frames to be transmitted to a corresponding destination mobile device. While attempting to transmit the frames to the receiver, the output frame buffer can grow in size if the output data rate is slowing down, or the buffer can shrink in size if the output data is transmitted at a faster data rate, for example, a data rate that is faster than expected.

In one embodiment, each sender has the ability to: 1) selectively drop frames (usually video frames) to keep its output buffer from backing up; and 2) transmit through the control channels of the communications network a control message comprising congestion details all the way back to the headset camcorder, for example, when such occurs. In one embodiment, those details include a) the initial speed of the link and b) whether the local buffer is growing or shrinking In another embodiment, those details further include the viewing capabilities of the destination mobile device, such as maximum display resolution, and decoding capability. Alternatively, each sender has the ability to transmit a simplified control message, e.g., a simple control signal, through the control channel when any threshold is reached, such as a sender's output buffer growing to a certain size or otherwise backing up. For example, the destination mobile device 145 may transmit at 320 a control message over control channel 140 when a threshold is reached. The control server coupled to the destination mobile device 145 via the control channel 140 receives the transmitted control message, and in turn, given the control server is coupled to the source mobile device 115 via control channel 125, forwards or otherwise retransmits the control message to the source mobile device 115. It should be noted that control server 165 may receive a control message (including a control signal) from more than one destination mobile device 145a-145n, in which case, the control server can process or combine multiple control messages from the more than one destination mobile device and relay only one message back through the control channel 125 to source mobile device 115.

Streaming server 155, as a sender, also may operate in the same manner as described above for destination mobile device 145, transmitting a control message at 325 to control server 165 when a threshold is reached, for example, an output buffer associated with a transmit queue grows beyond a threshold. The control server in turn forwards the message to source mobile device 115 via control channel 125.

In one embodiment, source mobile device 115 and the streaming server 155 are able to adjust the data rate previously negotiated for transmitting the audiovisual stream to the next respective stage in the communications network, namely, the streaming server 155 and the destination communication device 145, responsive to receiving the control message from the control server.

Ultimately, the source mobile device 115, which is coupled to the camcorder via the wireless control channel 110, transmits a control message to the camcorder at 335, responsive to receiving the same from control server 165, or when the source mobile device itself detects reaching a threshold of its own, such as its output buffer overflowing or the output buffer reaching a certain size, as depicted at 330 in the flowchart of FIG. 3.

In any case, at 340 the camcorder adjusts the encoding bit rate at which to stream encoded audiovisual content over the wireless communication channel 105 to adjust the data rate for audiovisual content to be transmitted, based on its output buffer overflowing or receiving a control message from the source mobile device 115 or otherwise receiving information about the communications network or nodes therein, such as described above: link speed, buffer size, buffer growth, or maximum display bit rate or decoding capability of the destination mobile device 145. The goal according to one embodiment of the invention is to ensure that maximum video quality that can be transmitted is transmitted while minimizing detail of delivery of the audiovisual stream.

Thumbnail Images Transmission

Figure 2:
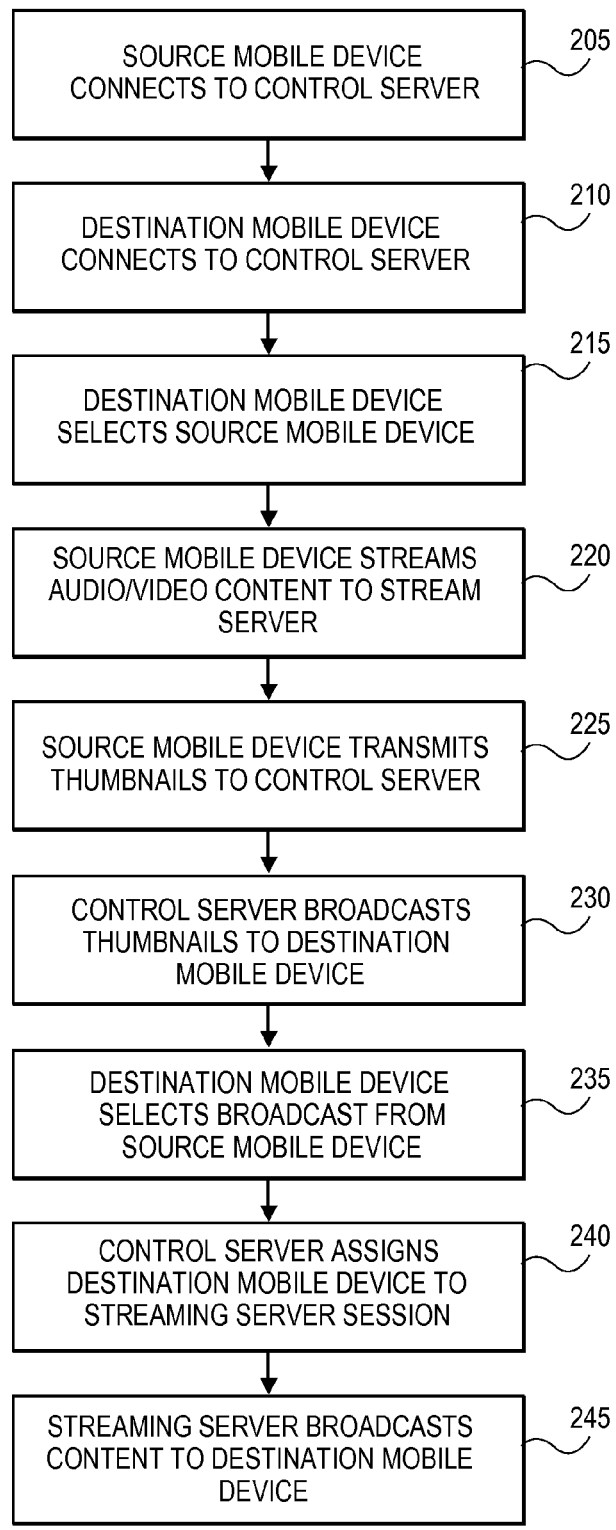
FIG. 2 is a flow chart depicting an embodiment of the invention.

With reference to the flowchart 200 in FIG. 2, broadcasting a stream of audiovisual content is described. A broadcaster decides to transmit live audiovisual content, enables the camcorder 101 to communicate with source mobile device 115 by powering up the camcorder and executing an application program on the source mobile device to receive the stream of audiovisual content once the camcorder begins recording content. The source mobile device 115 connects at 205 to the control server 165 selected by application monitor 175 as described above, for example, by virtue of starting execution of the application program on the source mobile device.

Likewise a destination mobile communication device 145 ("invited viewer") connects at 210 via control channel 140 to the control server selected by application monitor 175 as described above, for example, by starting execution of an application program on the destination mobile device that is to receive, process, and display an audiovisual stream. A user of the destination mobile device 145 reviews a list of contacts or friends to determine if any such contacts or friends are online and have audiovisual content to share. From this list of contacts that are online, the user selects at 215 the source mobile device 115, and this selection is communicated from destination mobile device 145 to control server 165 via control channel 140.

At this point, a broadcaster may elect to begin transmitting a stream of audiovisual content from the camcorder and so indicate by providing input to the application program executing on the source mobile device. The source mobile device communicates over control channel 125 to the control server 165 that it is ready to stream audiovisual content. The control server receives the indication that an audiovisual stream is ready to be transmitted. In one embodiment, the indication identifies which destination communication devices 145a-145n are invited to receive the audiovisual stream. In one embodiment, the control server receives the indication in a HyperText Transfer Protocol (HTTP) Get message. In response to receiving the indication, the control server assigns a streaming server 155 to which the source mobile device 115 establishes a connection over communication channel 120 to stream the audiovisual content.

In one embodiment of the invention, the indication that the source mobile device is ready to stream audiovisual content comprises a destination identifier for each of the destination mobile devices 145 to which to stream the audiovisual content. In one embodiment, the indication further comprises a stream identifier associated with audiovisual stream. The source mobile device 115 then begins streaming the audiovisual content to streaming server 165 at 220.

At 225, concurrently according to one embodiment of the invention, source mobile device 115 begins periodically transmitting selected thumbnail images, each essentially a single frame of the audiovisual stream such that the sequence of thumbnail images are representative of the audiovisual stream, to control server 165 over control channel 125. In another embodiment, the thumbnail images are transmitted to control server 165 prior to streaming the audiovisual content to streaming server 155, the streaming not beginning until the invited viewer receives the thumbnail images and selects, based on user input, to receive the corresponding audiovisual stream, as described below. In one embodiment, the thumbnail images representative of the audiovisual stream are compressed images, for example, the images may comprise Joint Photographic Experts Group (JPEG) images.

The control server receives the thumbnail images transmitted by source mobile device 115, representative of the audiovisual stream, via control channel 125, and in turn, periodically transmits at 230 via control channel 140 the thumbnail images to the destination mobile device 145 that selected the source mobile device at 215. At 235, the destination mobile device 145, responsive to the device receiving user input indicating to receive the audiovisual stream corresponding to the thumbnail images, transmits a request over control channel 140 to control server 165 to receive the corresponding audiovisual stream to be broadcast from streaming server 155. In one embodiment, the request to receive the audiovisual stream comprises a stream identifier associated with the audiovisual stream.

The control server 165, receiving the request to receive the audiovisual stream from mobile destination device 145, assigns at 240 (or redirects as the case may be, for example, if the destination mobile device 145 was previously receiving a different audiovisual stream) the destination mobile device 145 to a session on streaming server 155 via which the audiovisual content is to be broadcast, over communication channel 135. At 245, the streaming server broadcasts over communication channel 135 the audiovisual content to destination mobile device 145.

Camcorder Multiple Encoding

Figure 4:
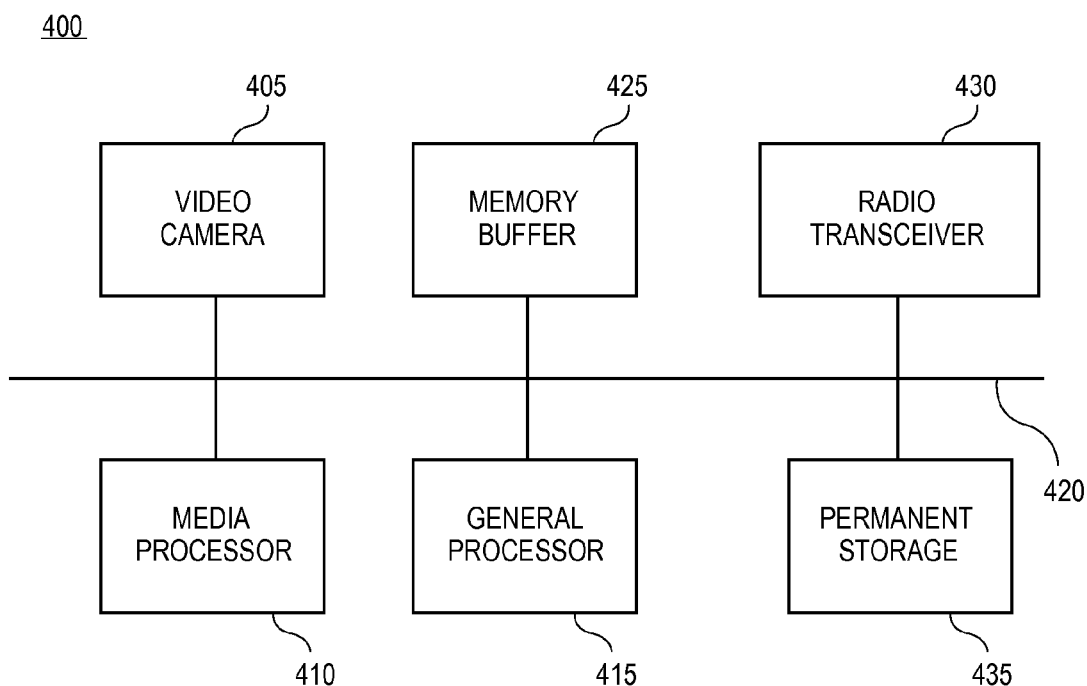
FIG. 4 is a block diagram of an embodiment of the invention.

With reference to FIG. 4, the camcorder 101 is depicted in block diagram 400 comprising a video camera 405, for example, a Video Graphics Array (VGA) resolution video camera capturing 640×480 pixels at 30 frames per second, a bus 420 to which the camera 405 is coupled, and one or more capture buffers, for example, a capture buffer maintained in a memory such as volatile Dynamic Random Access Memory (DRAM) 425, and a second capture buffer maintained in nonvolatile memory such as permanent storage device 435. Both memory 425 and permanent storage device 435 are also coupled to bus 420. A media processor is coupled to the video camera via the bus to receive audiovisual content from the video camera at the VGA resolution and at 30 frames per second. The media processor is capable of encoding and transferring the audiovisual content received from the video camera to one or all of the capture buffers, at the same or different bit rates, and at the same or different encoding resolutions. Importantly, the media processor encodes and stores the audiovisual content at a lower bit rate, for example, 15 frames per second in the capture buffer(s). Additionally, the encoder may be used to generate multiple encoded video streams with the same frame rate and resolution but different bit rates by using different compression schemes on the different respective streams or using a higher proportion of progressive frames instead of independent frames.

A radio transmitter/receiver (transceiver) 430 is coupled via bus 420 to media processor 410, which transfers the received audiovisual content from video camera 405 to radio transceiver 430 for transmission over communications channel 105 to source mobile device 115. The media processor transfers the audiovisual content at a lower bit rate to the transceiver for output over communications channel 105 such that when the transfer rate for transferring the content to the transceiver 420 is added to the transfer rates for transferring the content to one or more of buffers, such as buffers in memory 425 and permanent storage 435, the combined transfer rate does not exceed the rate at which the content is received from video camera 405. Thus, in an example in which the audiovisual content is received from video camera 405 at 30 frames per second and transferred to buffer 425 at 15 frames per second, the transfer rate for transferring the content to the transceiver 420 is at most 15 frames per second. In another example, if the audiovisual content is received at 30 frames per second from video camera 405 and transferred to the memory buffer at 24 frames per second, then the audiovisual content is transferred to radio transceiver 430 at 6 frames per second.

Media processor 410 performs this multiple encoding technique under programmatic control of general processor 415. In particular, general processor 415 executes a computer program, or set of computing instructions, to program or control the media processor to transfer the audiovisual content to the memory and/or permanent storage at first rates less than the received frame rate, and to transmit the audiovisual content to the radio transceiver at a second rate less than the received frame rate, wherein the addition of the first rates and second rate is less than or equal to the received frame rate. In one embodiment, the capture buffer is implemented in a 2 GB memory so that up to 1.5 hours of VGA quality (640×480) audiovisual content may be stored. In another embodiment, the capture buffer is implemented in a large capacity permanent storage device so that many hours of VGA quality audiovisual content may be permanently stored.

The multiple encoder in one embodiment produces a) up to a 30 fps and 640×480 resolution encoded video stream with little compression as a high quality stream for the on-board recording or storage in memory or permanent storage, and b) a lower bit-rate video stream where the frame rate and/or the resolution is less than 30 fps and 640×480 pixels. In one embodiment, 15 fps is used, which automatically cuts the data rate in half, but in other embodiments, this may not be sufficient. Importantly, the video compression is increased which lowers the bit-rate and lowers the quality of the transmitted video stream. Quality can be reduced by using higher compression of the video frames and/or by using more low bit-rate P-frames than high bit-rate I-frames.

CONCLUSION

An embodiment of the invention may be a machine-readable medium having stored thereon instructions that cause a programmable processor to perform operations as described above. Alternatively, a machine-readable medium might contain information to configure a digital signal processor ("DSP") to process one or more signals as explained. In other embodiments, the operations might be performed by specific hardware components that implement the operations described above. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the invention have been described largely by reference to specific examples and in terms of particular allocations of functionality to certain hardware and/or software components. However, those of skill in the art will recognize that embodiments can also be produced by software and hardware that centralize or distribute the functions of the embodiments of this invention differently than herein described. Such variations and implementations are understood to be captured according to the following claims.

What is claimed is:

1. A wireless camcorder comprising:
   an input interface of the wireless camcorder via which audiovisual information is to be received at n frames per second;
   a bus;
   a capture buffer of the wireless camcorder to store at least a portion of the received audiovisual information;
   a wireless output interface to transmit at least a portion of the received audiovisual information from the wireless camcorder at y frames per second;
   a media processor coupled via the bus to the input interface, to the capture buffer, and to the wireless output interface;
   a general purpose processor coupled to the media processor; and
   a set of computing instructions executable on the general purpose processor to program or control the media processor to:
      perform multiply encoding of the received audiovisual information to generate first encoded audiovisual information and second encoded audiovisual information;
      transfer the first encoded audiovisual information from the media processor to the wireless output interface at a rate of y frames per second; and
      transfer the second encoded audiovisual information from the media processor to the capture buffer at a rate of x frames per second, wherein the addition of x and y is less than or equal to n.

2. The wireless camcorder of claim 1, wherein the input interface comprises a Video Graphics Array (VGA) camera and n is equal to 30.

3. The wireless camcorder of claim 2, wherein the media processor is to transfer the second encoded audiovisual information to the capture buffer at 15 frames per second for storage therein.

4. The wireless camcorder of claim 3, wherein the media processor is to transfer the first encoded audiovisual information to the output interface at 15 frames per second.

5. The wireless camcorder of claim 4, wherein the output interface operates in accordance with the Bluetooth wireless technology standard.

6. The wireless camcorder of claim 1, wherein the media processor is to transfer the second encoded audiovisual information to the capture buffer at 24 frames per second for storage therein and is to transfer the first encoded audiovisual information to the output interface at 6 frames per second, and wherein n is equal to 30 frames per second.

* * * * *